United States Patent
Wobak et al.

(10) Patent No.: US 12,348,343 B2
(45) Date of Patent: Jul. 1, 2025

(54) METHOD AND DEVICE FOR DETECTING PROXIMITY OF AN EXTERNAL RF FIELD DURING ONGOING RF ACTIVITY OF THE DEVICE

(71) Applicant: NXP B.V., Eindhoven (NL)

(72) Inventors: Markus Wobak, Kumberg (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 6 days.

(21) Appl. No.: 18/482,940

(22) Filed: Oct. 9, 2023

(65) Prior Publication Data
US 2025/0119329 A1    Apr. 10, 2025

(51) Int. Cl.
*H04L 27/06*   (2006.01)
*H04L 27/04*   (2006.01)

(52) U.S. Cl.
CPC .............. *H04L 27/04* (2013.01); *H04L 27/06* (2013.01)

(58) Field of Classification Search
CPC ... H04L 1/04; H04L 1/06; H04L 27/04; H04L 27/06
See application file for complete search history.

(56) References Cited

U.S. PATENT DOCUMENTS

| | | |
|---|---|---|
| 7,289,571 B1 | 10/2007 | Nebel et al. |
| 9,634,725 B2 | 4/2017 | Rizzo et al. |
| 9,654,181 B1 | 5/2017 | Wobak et al. |
| 10,945,206 B2 | 3/2021 | Hueber et al. |
| 2013/0084803 A1* | 4/2013 | Hall ................ H04W 4/80 455/41.1 |
| 2021/0374365 A1 | 12/2021 | Patricio et al. |

FOREIGN PATENT DOCUMENTS

EP    2801930 A1    11/2014

OTHER PUBLICATIONS

NFC Forum: "NFC Digital Protocol 1-15 Technical Specification", Internet Citation, Nov. 17, 2010, pp. 1-175.

* cited by examiner

*Primary Examiner* — Rahel Guarino

(57) ABSTRACT

A method is provided for detecting a proximity of a radio frequency (RF) field during an ongoing RF activity by a wireless device operating in reader mode. In the method, an input signal is modulated to provide a modulated RF signal comprising a plurality of RF modulation periods. The plurality of RF modulation periods are transmitted by the wireless device operating in the reader mode. An RF detector is enabled to monitor the plurality of modulation periods during the transmitting of the plurality of RF modulation periods. An external RF signal is detected when a characteristic of the plurality of RF modulation periods is different from an expected characteristic. In another embodiment, a wireless device is provided that implements the method.

20 Claims, 5 Drawing Sheets

METHOD AND DEVICE FOR DETECTING PROXIMITY OF AN EXTERNAL RF FIELD DURING ONGOING RF ACTIVITY OF THE DEVICE

BACKGROUND

Field

This disclosure relates generally to electronic circuits, and more particularly, to a method and device for detecting proximity of an external radio frequency (RF) field during ongoing RF activity of the device.

Related Art

Applications for wireless technologies such as near field communications (NFC) have evolved over time, which results in an increased use of mobile reader devices as well as the wireless charging of small-scale accessories like stylus pens for tablets, wearables or hearables. This results in more portable devices with an enabled NFC carrier such as mobile phones, charging cradles, and reader devices that have their RF field enabled not only for a few hundreds of milliseconds (like conventional NFC payment, access or transit transactions) but much longer for NFC charging. As a result, two NFC reader devices may have successfully preformed initial RF collision avoidance without detecting other RF fields before enabling their own RF carrier, but may then be brought into close proximity with each other at a later stage.

Additionally, some legacy or closed system reader implementations do not perform RF collision avoidance at all, such as devices that are not compliant with NFC Forum or ISO/IEC 18092. Examples of non-compliant devices include transit terminals or payment terminals. Thus, an NFC device may have performed RF collision avoidance prior to enabling its RF field, but is then positioned close to another device that has its RF field enabled. This may present a risk of RF communication instability, and may interrupt ongoing NFC activity such as wireless charging of accessories.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
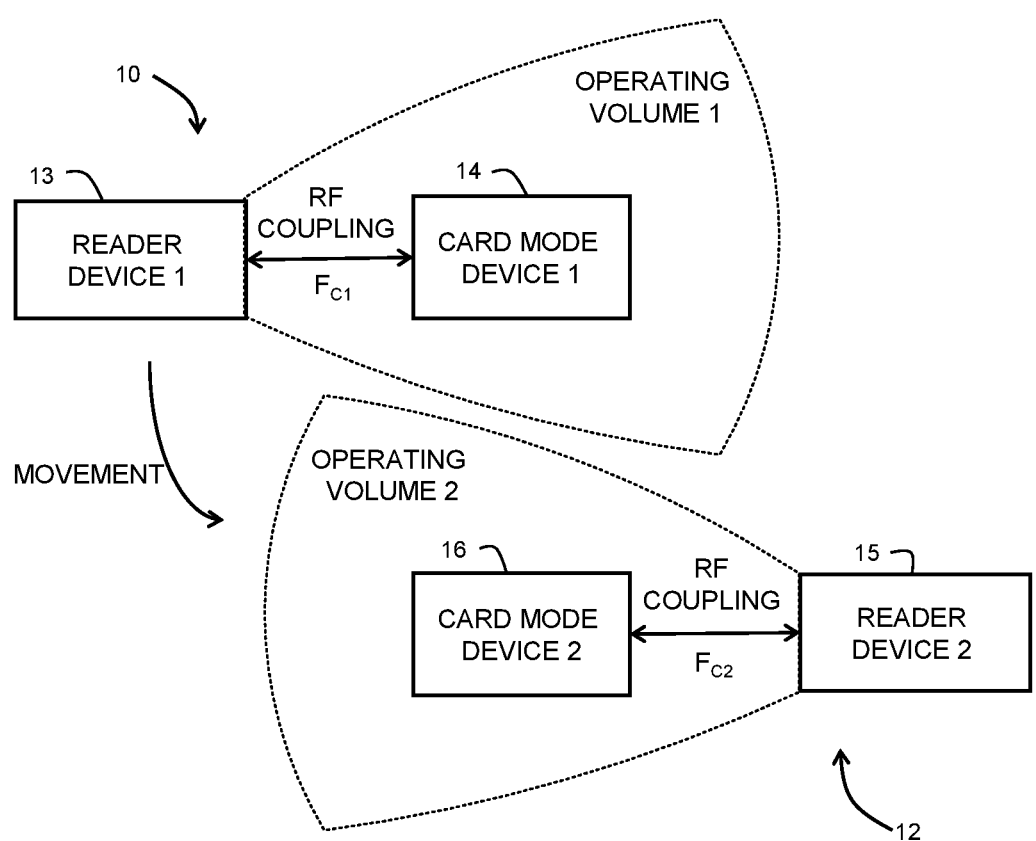
FIG. 1 illustrates a first NFC system comprising an ongoing NFC activity between a first reader device and first card mode device using a first carrier frequency positioned proximate to a second NFC system comprising a second reader device and a second card mode device using a second carrier frequency.

Generally, there is provided, a method for detecting proximity of an external radio frequency (RF) field during an ongoing RF activity of a wireless device operating in reader mode. The wireless device may be a near field communication (NFC) device, RF identification (RFID) device, or a device operating under some other wireless protocol. In the device, a digital input signal to be transmitted is used to modulate an RF field to provide a modulated RF signal comprising a plurality of RF modulation periods interspersed with periods when the RF field is not modulated. The modulation type may be amplitude-shift keying (ASK) 100 modulation. The plurality of RF modulation periods is transmitted by the wireless device operating in the reader mode. While the RF device is transmitting, an RF detector of the RF device monitors the plurality of modulation periods for one or more characteristics that indicate a possible presence of another RF field. In one embodiment, the RF detector is continuously enabled to detect another RF field. In another embodiment, the RF detector is selectively enabled in synchronization with the ASK 100 modulation periods. The RF detector has detected an external RF signal when a characteristic of the plurality of RF modulation periods is different from an expected characteristic.

In the event an external RF field is detected, the RF device may notify a user. In addition, the RF device may reduce RF signal strength to reduce interference, conclude the ongoing RF activity, and/or transition into a card emulation mode.

In accordance with an embodiment, there is provided, a method for detecting a proximity of an external radio frequency (RF) signal during an ongoing RF activity by a wireless device operating in reader mode, the method including: modulating an input signal to provide a modulated RF signal comprising a plurality of RF modulation periods; transmitting the plurality of RF modulation periods by the wireless device operating in the reader mode; enabling an RF detector to monitor the plurality of modulation periods during the transmitting of the plurality of RF modulation periods; and detecting an external RF signal when a characteristic of the plurality of RF modulation periods is different from an expected characteristic. Detecting the external RF signal may further include detecting a signal strength of the modulated RF signal and the signal strength is greater than a threshold signal strength. Detecting the proximity of the external RF field may further include the characteristic being different from expected based on a number of observed edges of a clock signal recovered from the input signal being outside a predetermined frequency range. The plurality of modulation periods may include amplitude-shift keying (ASK) 100 modulation periods, and the enabling the RF detector may be synchronized with the ASK 100 modulation periods by an RF detector controller. The transmitting of the plurality of RF modulation periods may further include, transmitting the plurality of RF modulation periods to a device operating in card mode, and while transmitting, putting the device operating in card mode into a sleep mode to allow switching the plurality of RF modulation periods from one modulation protocol to ASK 100 modulation. The method may further include delaying the enabling of the RF detector a configurable delay time following a decay of a modulation period of the plurality of modulation periods. The enabling the RF detector may further include enabling the RF detector to operate continuously during the transmitting of the plurality of RF modulation periods. The enabling the RF detector may further include enabling the RF detector during selected modulation periods of the plurality of modulation periods further comprises the RF detector being enabled continuously. The detecting a proximity of the external RF signal may further include detecting a presence of a signal during modulation periods of the plurality of modulation periods when there should not be a signal.

In accordance with another embodiment, there is provided, a method for detecting a proximity of an external radio frequency (RF) signal during an ongoing RF activity by a wireless device operating in reader mode, the method including: modulating an input signal to provide a modulated RF signal comprising a plurality of RF modulation periods; transmitting the plurality of RF modulation periods by the wireless device operating in the reader mode; enabling an RF detector to detect an external RF signal from another wireless device operating in reader mode, wherein the RF detector is selectively enabled between selected periods of the plurality of modulation periods of the modulated RF signal; and detecting the external RF signal when a characteristic of the modulated RF signal is different from an expected characteristic. The detecting the external RF signal may further include detecting a signal strength, and the signal strength may be greater than a threshold signal strength. The detecting the external RF field may further include the characteristic being different from expected based on a number of observed edges of a clock signal recovered from the input signal being outside a predetermined frequency range. The enabling the RF detector may further include enabling the RF detector to operate continuously during the transmitting of the plurality of RF modulation periods. The plurality of modulation periods may be amplitude-shift keying (ASK) 100 modulation periods, and the enabling the RF detector may be synchronized with the ASK 100 modulation periods.

In accordance with yet another embodiment, there is provided, a wireless reader device including: a modulator configured to modulate an input signal to provide a modulated radio frequency (RF) signal comprising a plurality of RF modulation periods; a transmitter configured to transmit the modulated RF signal; a RF detector configured to receive the modulated RF signal and to detect an external RF signal from another device operating in reader mode during transmission of the modulated RF signal; and an RF detector controller, coupled to the RF detector and configured to enable the RF detector to monitor the modulated RF signal for an indication of an external RF signal, wherein the external RF signal is detected by the RF detector when a characteristic of the modulated RF signal is different from an expected characteristic. The characteristic may be a signal strength of the modulated RF signal. The characteristic may be a frequency of a clock signal that is recovered from the input signal. The wireless device may be operated according to a near field communication (NFC) protocol. The plurality of modulation periods may be amplitude-shift keying (ASK) 100 modulation periods, and wherein the RF detector may be enabled in synchronization with the ASK 100 modulation periods. The WLC device may further include delaying the enabling of the RF detector a configurable delay time after a modulation period of the plurality of modulation periods.

RFID and NFC communication at 13.56 MHz is performed by a reader device inductively coupled to at least one card or card mode counterpart. The reader device generates an RF carrier that can be received and used by other devices such as card mode devices and tags. Communication between the devices is defined in respective RF standards such as NFC Forum, EMVCo Contactless, ISO/IEC 14443, 15693, and 18000. Communication between multiple devices may be performed time interleaved. Data symbols are generated by the reader device using ASK modulation and by applying coding schemes. Card mode devices reply by means of load modulation. For example, NFC Forum defines multiple RF technologies like NFC-A, NFC-B, NFC-F, NFC-V, where the reader (polling device) uses either ASK100 or ASK10 symbol modulation for communication. A card mode device may be, for example, an NFC device such as a smartcard or RFID tag that does not include a battery and relies on the RF field generated by a reader for power.

Conventional NFC systems require that only one reader device is active and generating an RF carrier at a time. This provides a robust NFC communication system without communication instabilities impacting the main end-user consumer application such as payment, transit, or ticketing. Communication instabilities may be caused by a physical effect referred to as "beat frequency" between two RF carriers with nearly the same RF carrier frequency. Together the RF carriers will generate a low frequency signal difference that may cause reception failures. Real-life NFC readers will generate an RF carrier close to 13.56 MHz within a certain tolerance to satisfy regulatory requirements. But in practice, the RF carriers of two reader devices will usually not be at the exact same RF carrier frequency. This may be caused by the use of unsynchronized reference clocks, such as separate crystal oscillators that are tuned to have a slightly different frequency. Additionally, a reader device with its RF field active may be influenced by the load modulation of a card mode counterpart coupled with another reader.

RF collision avoidance (as defined and required by NFC standards like NFC Forum) is defined to overcome the problem of two RF devices in close proximity to each other and in active reader mode at the same time. Before an NFC reader device enables its RF carrier to initiate an NFC transaction it checks for the presence of an external RF field. Only if it is determined there is no detected RF field, or only a negligibly weak external RF field, the NFC reader is allowed to enable its RF carrier. Depending on RF power and antenna size, RF collision avoidance may detect external RF fields from a few centimeters distance down to below millimeter distance. However, this does not solve the problem of two active reader devices coming into proximity with each other after their RF fields have already been activated.

Note that resetting the RF field recurringly to perform repeated RF collision avoidance is not a viable option. An RF reset lasts at least 5 milliseconds as required by NFC standards, and resets the RF state machine of the card mode counterpart (protocol overhead applies) and interrupts any ongoing NFC charging activity. Also, interrupting battery charging can increase the number of battery charging cycles a battery is subjected to, thus reducing battery life. In addition, a reset of the RF field to perform a collision avoidance check may come too late because the RF communication may have already been interrupted prior to performing it.

FIG. 1 illustrates a first NFC system 10 comprising an ongoing NFC activity between a first reader device 13 and first card mode device 14 using a first carrier frequency $f_{C1}$ positioned separate from a second NFC system 12 comprising a second reader device 15 and a second card mode device 16 using a second carrier frequency $f_{C2}$. Each NFC system has an operating volume that defines its range of reliable communication. Each NFC system has independently, from the other, enabled its RF field. Collision avoidance may have been used prior to enabling their fields, or not. Nevertheless and as more and more NFC systems are mobile (example: mobile phones, wearables, NFC wireless charging cradles), both NFC systems 10 and 12 may be brought into proximity with each other such that their respective enabled RF fields having closely spaced frequencies interact with each other. Commonly, frequencies $f_{C1}$ and $f_{C2}$ are not exactly at 13.35 MHZ, and in general, will have some offset to each other (e.g., two asynchronous reference clocks are used). Thus, the frequency difference between them may cause a beat frequency which may impact RF communication stability. Constructive and destructive interference may further cause resets or device damage to card emulation devices that pick up a transient RF signal that is too low or too high.

To prevent this problem, both reader device 13 and reader device 15 include an RF detector, according to an embodiment, that is enabled to detect another RF field at the about the same frequency while an RF activity is ongoing. An embodiment of a reader device including the RF detector is illustrated in FIG. 2.

Figure 2:
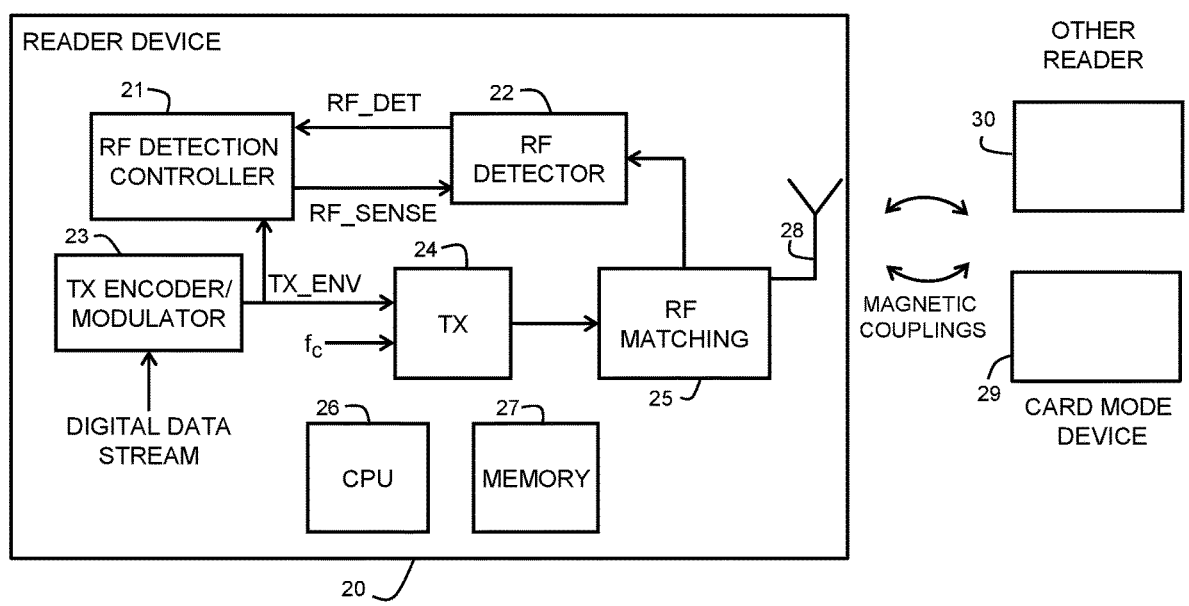
FIG. 2 illustrates, in block diagram form, a wireless device according to an embodiment.

FIG. 2 illustrates, in block diagram form, reader device 20 according to an embodiment. For propose of simplicity and clarity, only the circuits used for transmission are illustrated. Reader device 20 is magnetically coupled with a card mode counterpart 29. Another reader device 30 is positioned within communication range of reader device 20. Reader device 20 includes RF detection controller 21, RF detector 22, transmitter (TX) encoder/modulator 23, transmitter 24, RF matching circuit 25, central processing unit (CPU) 26, and memory 27. Transmitter encoder/modulator 23 has an input for receiving a digital data stream labeled "DIGITAL DATA STREAM," and an output for providing a transmission envelope signal labeled "TX_ENV" to transmitter 24 that is used to enable and disable transmitter 24 to form a frame for transmission using ASK 100 modulation. The digital data stream may be generated by CPU 26 and/or memory 27. Transmitter 24 has an input for receiving carrier frequency fc, and an output coupled to RF matching circuit 25, which is coupled to antenna 28. An electromagnetic coupling can be formed for communicating with, or wirelessly charging, card mode device 29. RF detection controller 21 controls the operation of RF detector 22. RF detection controller 21 has an input for receiving the transmitter enable signal TX_ENV from TX encoder/modulator 23. RF detection controller 21 has an output for providing an enable signal labeled "RF_SENSE" to RF detector 22. RF detector 22 has an input coupled to RF matching circuit 25. In response to detecting an externally generated RF field, RF detector 22 provides a detection signal labeled "RF_DET" to RF detection controller 21. CPU 26 may be any type of one or more processors. Memory 27 may be a non-volatile memory.

For NFC ASK 100 modulation, the unmodulated 13.56 MHz RF carrier is "muted" for specific time periods to enable communication of a digital signal. The sequence of modulated and unmodulated time periods forms symbols that represent encoded data. In one embodiment, RF detector 22 is used to check for the presence of an external RF carrier periodically during the ASK 100 modulation periods while RF communication or charging activity is ongoing. NFC RF coupling systems build a resonant magnetic tank. A system quality factor (Q factor) impacts decaying of the transmitted signal following a ASK100 modulation time period. Especially for mobile and actively powered devices such as NFC wireless charger systems, the quality factor is comparatively low (e.g., typically less than 10). Thus, a short time after ending a modulation pulse, no RF signal is expected in the resonant tank for ASK 100 modulation. However, if another RF carrier is picked up by the NFC antenna, there will an external RF carrier signal present during ASK 100 modulation when no modulation signal is expected. According to an embodiment, RF detector 22 is activated, or enabled, by RF detection controller 21 in a defined time period between pulses during ASK 100 modulation to sense the presence of an external RF carrier such as from other reader 30. One implementation may re-use the existing RF detector used for RF collision avoidance. When enabled, RF detector 22 checks whether a characteristic of the transmitted signal is different from an expected characteristic. For example, one characteristic may be a signal strength, such as amplitude, exceeding a threshold. In one embodiment, the threshold may be configurable, and stored in memory 27. Memory 27 may be a non-volatile memory. Another characteristic may be a frequency of a recovered clock signal that is being modulated. The characteristic may be based on a number of observed edges of the recovered clock signal within a predetermined frequency range. For example, the 13.56 MHz frequency plus and/or minus a detection range. If the number of clock edges indicates the frequency is outside the predetermined frequency range, then an external RF field is detected.

RF detector controller 21 activates RF detector 22 at defined time periods during ongoing proximity coupling device (PCD) modulation of reader 20. Synchronization to the ASK modulation is done with TX envelope signal TX_ENV. A configurable delay time after start of an ASK 100 modulation period, the RF detector is enabled. In one embodiment, reader device 20 may be enabled to monitor an RF signal during arbitrarily selected ASK 100 modulation periods to detect external RF field presence. In another embodiment, RF detector 22 may be enabled to perform an RF detection check every ASK 100 modulation symbol of an NFC frame. Note that a typical NFC frame may have, e.g., between 8 and 1000 such modulation periods. RF device 20 may count the number of RF detections and may put it in relation to a total number of symbols. This may be used to generate a metric of the number of symbols with RF detection divided by the number of total symbols in this frame which can be interpreted as a percentage.

In one implementation, if the ASK 100 modulation periods are too short or another modulation schemes like ASK 10 is used, ongoing communication can be interrupted and ASK100 modulation with NFC-V (ISO/IEC 15693) which has a longer modulation period due to lower symbol rate (e.g. 26 kbps vs 106 kbps on NFC-A) can be used. The NFC protocol allows the card mode counterpart to be put into sleep mode to allow this switch to ASK 100. In another embodiment, if ASK 10 is used for communication, or ASK100 modulation time periods are too short to allow detection of the external device, there is no requirement to use an NFC-V modulation scheme. A proprietary ASK 100 modulation scheme may also be used. If the selected modulation scheme does not support detection of an external device, an ASK 100 modulation scheme of known type like NFC-V, or a proprietary ASK100 modulation scheme may be selected for detection of the external RF device. After the detecting is complete, the card mode device may be taken out of sleep mode and the preceding communication allowed to continue.

In the event an external RF signal is detected by RF detector 22, several actions may be taken. For example, an end user may be notified of the detection so that the user may separate the two systems such that interference is reduced. The notification may be a message on a display screen. In another embodiment, emitted RF power may be reduced to reduce the interference effect between the devices. In another embodiment, the ongoing reader mode activity may be concluded, or the ongoing reader mode activity may be concluded and the reader device switched to card emulation mode.

Using RF detector controller 21 and RF detector 22 in this manner provides proximity detection while being transparent to NFC activity. That is, the detection does not impact NFC compliance of a card mode counterpart, and is relatively simple to implement.

Figure 3:
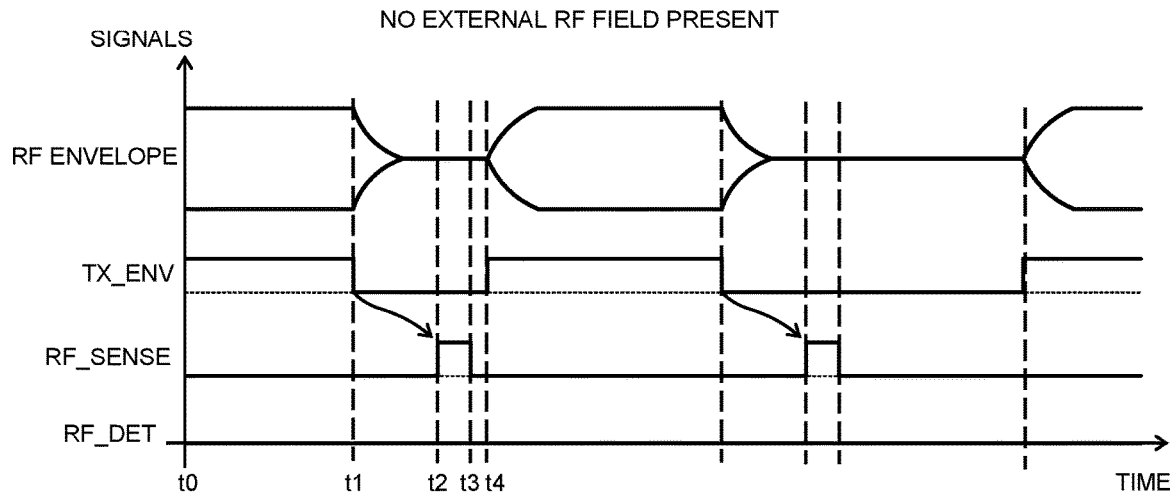
FIG. 3 illustrates a timing diagram of various signals of the wireless device of FIG. 2 when no external RF field is present according to a first embodiment.

FIG. 3 illustrates a timing diagram of various signals of the wireless device of FIG. 2 when no external RF field is present according to a first embodiment. A data symbol may include modulated periods and unmodulated periods. The RF ENVELOPE represents ASK 100 modulation where periods of an unmodulated signal (e.g., between times t0 and t1) are separated by modulated periods having no envelope signal (e.g., between times t1 and t4). Note that ASK 100 is 100 percent modulation, meaning no RF carrier is present and the envelope signal is "0". The transmitter envelope signal TX_ENV from TX encoder/modulator 23 is used by RF detection controller 21 to determine when to enable RF detector 22 using signal RF_SENSE as shown between times t2 and t3. Note that because the quality factor can impact how long it takes for each modulation pulse to delay, the assertion of RF_SENSE (between times t2 and t3) may be delayed by a predetermined delay as shown between times t1 and t2. The predetermined delay may be configurable and stored in memory 27. As can be seen in FIG. 3, detection signal RF_DET remains low throughout, indicating no external RF field is present.

Figure 4:
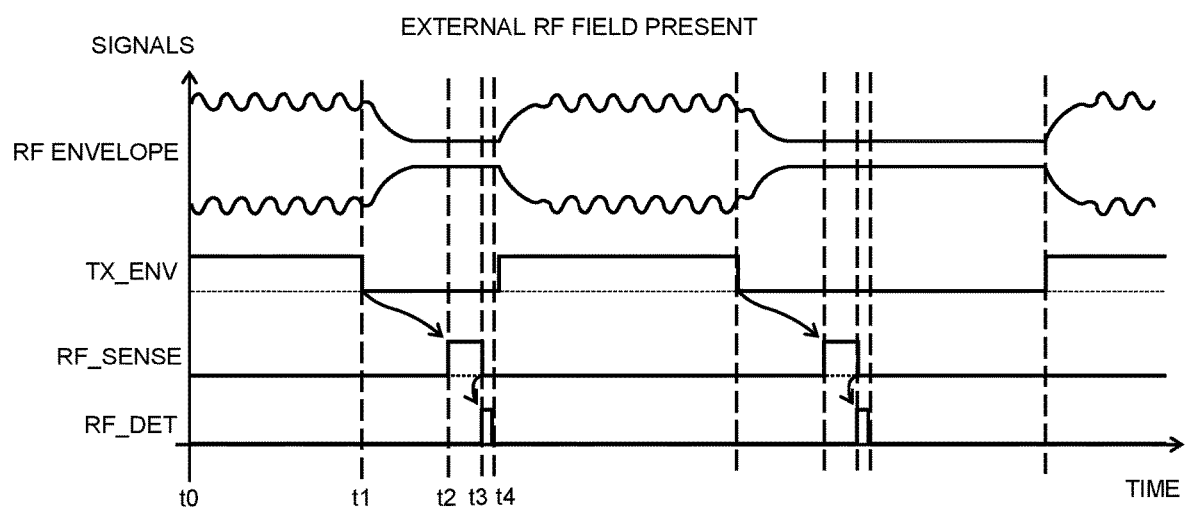
FIG. 4 illustrates a timing diagram of various signals of the wireless device of FIG. 2 when an external RF field is present according to the first embodiment.

FIG. 4 illustrates a timing diagram of various signals of the wireless device of FIG. 2 when an external RF field is present according to the first embodiment. A beat frequency caused by the proximity of two active reader devices is illustrated by exaggerated fluctuations of the modulation pulses in the RF ENVELOPE. The transmitter envelope signal TX_ENV from TX encoder/modulator 23 is used by RF detection controller 21 to determine when to enable RF detector 22 using signal RF_SENSE as shown between times t2 and t3. Note that because the quality factor can impact how long it takes for each modulation pulse to delay, the assertion of RF_SENSE (between times t2 and t3) may be delayed by a predetermined delay as shown between times t1 and t2. The predetermined delay may be configurable and stored in memory 27. As can be seen in FIG. 4, detection signal RF_DET transitions to a high between times t3 and t4, indicating the ASK 100 modulation did not go to zero after the pulse between t0 and t1, indicating an external RF field is present. In response to the detection of the external RF, an action may be taken.

Figure 5:
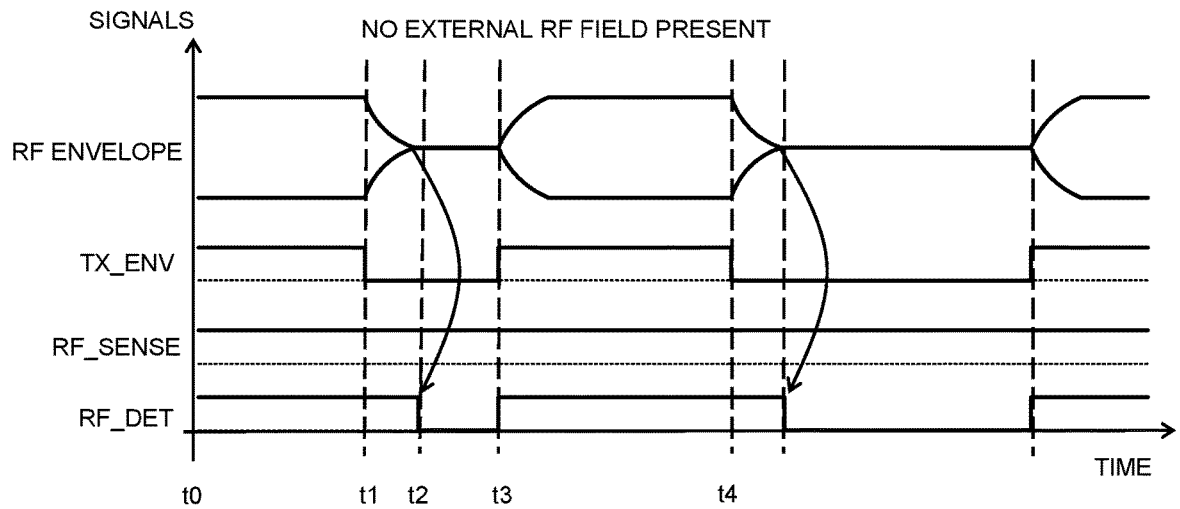
FIG. 5 illustrates a timing diagram of various signals of the wireless device of FIG. 2 when no external RF field is present according to a second embodiment.

FIG. 5 illustrates a timing diagram of various signals of the wireless device of FIG. 2 when no external RF field is present according to a second embodiment. The operation of the RF detector in the second embodiment of FIG. 5 may be considered an inverse of the first embodiment. During ongoing RF activity as shown by the unmodulated periods of RF ENVELOPE pulses between times t0 and t1, and between times t3 and t4, RF detector 22 is continuously enabled by a continuous logic high enable signal RF_SENSE from RF detector controller. Thus, RF detector 22 output RF_DET will continuously report a presence of an RF field except during an ASK100 modulation symbol between, e.g., times t2 and t3, because no RF field should be seen for a short time period during the modulation periods. If there is an RF field reported during an ASK100 modulation, then an external RF field may be present and detected because the RF field will not drop to zero, or below a threshold, during that time.

Figure 6:
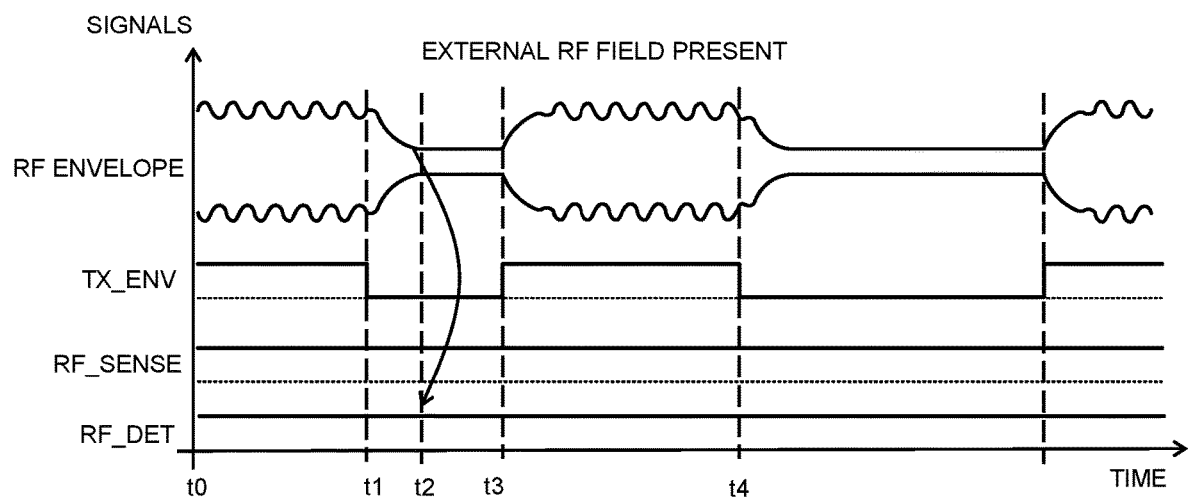
FIG. 6 illustrates a timing diagram of various signals of the wireless device of FIG. 2 when an external RF field is present according to the second embodiment.

FIG. 6 illustrates a timing diagram of various signals of the wireless device of FIG. 2 when an external RF field is present according to the second embodiment. Like in FIG. 5, enable signal RF_SENSE is continuously high so that the RF detector is always enabled. The RF detector detects a presence of the RF field between modulation pulses between times t2 and t3 when there should not be an RF ENVELOPE signal present, unlike in FIG. 5, indicating that an external RF field is present and detected by the RF detector signal RF_DET. Note that a beat frequency caused by the presence of the external RF field of about the same frequency is illustrated by the exaggerated fluctuations.

In another embodiment, instead of including RF detector 22 in an NFC reader device, an RF detection block that is already implemented on the NFC reader device for RF collision avoidance prior to enabling an RF field may also be used for RF field detection during ongoing NFC activity as discussed above.

Figure 7:
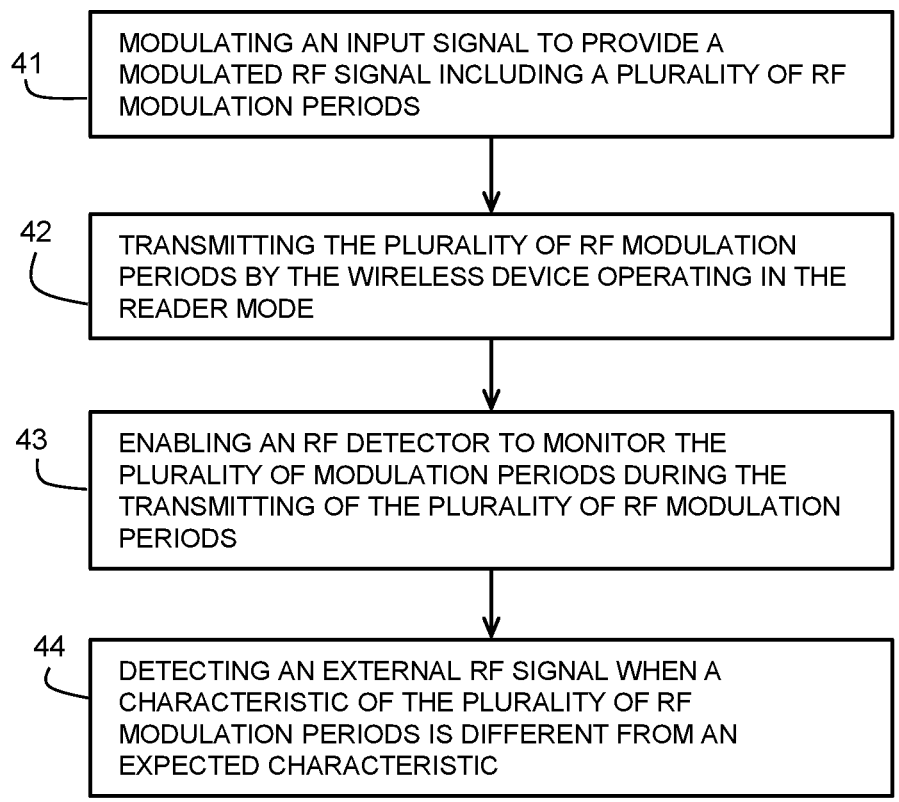
FIG. 7 illustrates a flowchart of a method for detecting proximity of an external RF signal during an ongoing RF activity of a wireless device operating in reader mode in accordance with an embodiment.

FIG. 7 illustrates a flowchart of method 40 for detecting proximity of an external RF signal during an ongoing RF activity by a wireless device operating in reader mode in accordance with an embodiment. Method 40 begins at block 41. At block 41, an input signal is modulated to provide a modulated RF signal including a plurality of RF modulation periods. At block 42, the plurality of modulation periods are transmitted by the wireless device operating in the reader mode. At block 43, an RF detector is enabled to monitor the plurality of modulation periods during the transmitting of the plurality of RF modulation periods. At block 44, an external RF signal is detected when a characteristic of the plurality of RF modulation periods is different from an expected characteristic.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for detecting a proximity of an external radio frequency (RF) signal during an ongoing RF activity by a wireless device operating in reader mode, the method comprising:
    modulating an input signal to provide a modulated RF signal comprising a plurality of RF modulation periods;
    transmitting the plurality of RF modulation periods by the wireless device operating in the reader mode;
    enabling an RF detector to monitor the plurality of modulation periods during the transmitting of the plurality of RF modulation periods; and
    detecting the proximity of the external RF signal when a characteristic of the plurality of RF modulation periods is different from an expected characteristic.

2. The method of claim 1, wherein detecting the external RF signal further comprises detecting a signal strength of the modulated RF signal and the signal strength is greater than a threshold signal strength.

3. The method of claim 1, wherein detecting the proximity of the external RF signal further comprises the characteristic being different from expected based on a number of observed edges of a clock signal recovered from the input signal being outside a predetermined frequency range.

4. The method of claim 1, wherein the plurality of modulation periods comprises amplitude-shift keying (ASK) 100 modulation periods, and the enabling the RF detector is synchronized with the ASK 100 modulation periods by an RF detector controller.

5. The method of claim 1, wherein the transmitting of the plurality of RF modulation periods further comprises, transmitting the plurality of RF modulation periods to a device operating in card mode, and while transmitting, putting the device operating in card mode into a sleep mode to allow switching the plurality of RF modulation periods from one modulation protocol to ASK 100 modulation.

6. The method of claim 1, further comprising delaying the enabling of the RF detector a configurable delay time following a decay of a modulation period of the plurality of modulation periods.

7. The method of claim 1, wherein enabling the RF detector further comprises enabling the RF detector to operate continuously during the transmitting of the plurality of RF modulation periods.

8. The method of claim 1, wherein enabling the RF detector further comprises enabling the RF detector during selected modulation periods of the plurality of modulation periods further comprises the RF detector being enabled continuously.

9. The method of claim 1, wherein the detecting the proximity of the external RF signal further comprises detecting a presence of a signal during modulation periods of the plurality of modulation periods when there should not be a signal.

10. A method for detecting a proximity of an external radio frequency (RF) signal during an ongoing RF activity by a wireless device operating in reader mode, the method comprising:
    modulating an input signal to provide a modulated RF signal comprising a plurality of RF modulation periods;
    transmitting the plurality of RF modulation periods by the wireless device operating in the reader mode;
    enabling an RF detector to detect an external RF signal from another wireless device operating in reader mode, wherein the RF detector is selectively enabled between selected periods of the plurality of modulation periods of the modulated RF signal; and
    detecting the external RF signal when a characteristic of the modulated RF signal is different from an expected characteristic.

11. The method of claim 10, wherein detecting the external RF signal further comprises detecting a signal strength, and the signal strength is greater than a threshold signal strength.

12. The method of claim 10, wherein detecting the external RF field signal further comprises the characteristic being different from expected based on a number of observed edges of a clock signal recovered from the input signal being outside a predetermined frequency range.

13. The method of claim 10, wherein enabling the RF detector further comprises enabling the RF detector to operate continuously during the transmitting of the plurality of RF modulation periods.

14. The method of claim 10, wherein the plurality of modulation periods are amplitude-shift keying (ASK) 100 modulation periods, and the enabling the RF detector is synchronized with the ASK 100 modulation periods.

15. A wireless reader device comprising:
    a modulator configured to modulate an input signal to provide a modulated radio frequency (RF) signal comprising a plurality of RF modulation periods;
    a transmitter configured to transmit the modulated RF signal;
    a RF detector configured to receive the modulated RF signal and to detect an external RF signal from another device operating in reader mode during transmission of the modulated RF signal; and
    an RF detector controller, coupled to the RF detector and configured to enable the RF detector to monitor the modulated RF signal for an indication of an external RF signal, wherein the external RF signal is detected by the RF detector when a characteristic of the modulated RF signal is different from an expected characteristic.

16. The wireless reader device of claim 15, wherein the characteristic is a signal strength of the modulated RF signal.

17. The wireless reader device of claim 15, wherein the characteristic is a frequency of a clock signal that is recovered from the input signal.

18. The wireless reader device of claim 15, wherein the wireless device is operated according to a near field communication (NFC) protocol.

19. The wireless reader device of claim 15, wherein the plurality of modulation periods are amplitude-shift keying (ASK) 100 modulation periods, and wherein the RF detector is enabled in synchronization with the ASK 100 modulation periods.

20. The wireless reader device of claim 15, further comprising delaying the enabling of the RF detector a configurable delay time after a modulation period of the plurality of modulation periods.

\* \* \* \* \*